Feb. 16, 1960 C. L. BROWN, JR., ET AL 2,925,289
CANTED RING PIPE COUPLING
Filed July 17, 1956 3 Sheets-Sheet 1

INVENTORS
CHARLES L. BROWN, JR.
WILLIAM ZURKOWSKI
BY
Thomas L. Brith
THEIR ATTORNEY

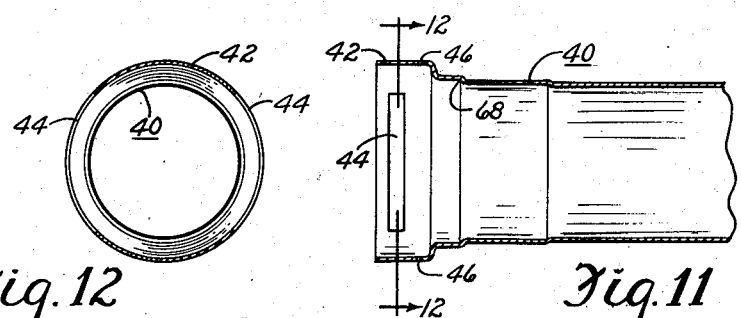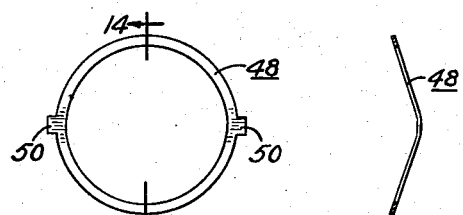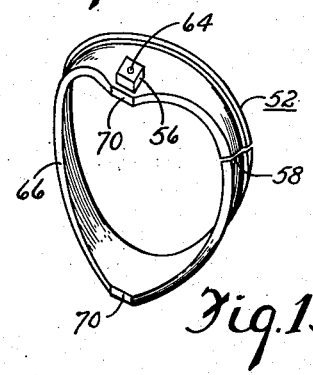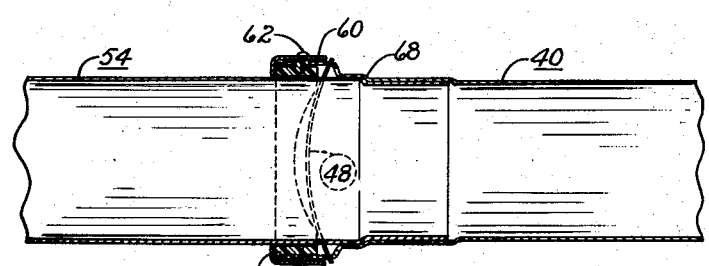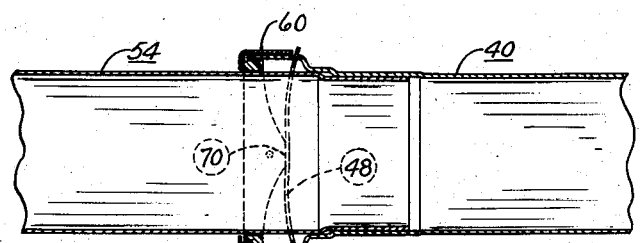

Feb. 16, 1960  C. L. BROWN, JR., ET AL  2,925,289
CANTED RING PIPE COUPLING
Filed July 17, 1956  3 Sheets-Sheet 3

INVENTORS
CHARLES L. BROWN, JR.
WILLIAM ZURKOWSKI
BY
Thomas C. Betts
THEIR ATTORNEY 2,925,289
Patented Feb. 16, 1960

2,925,289
CANTED RING PIPE COUPLING

Charles L. Brown, Jr., and William Zurkowski, Stamford, Conn., assignors to Electrolux Corporation, Old Greenwich, Conn., a corporation of Delaware Application July 17, 1956, Serial No. 598,411

1 Claim. (Cl. 285—7)

Our invention relates to couplings for releasably securing together two telescoping parts, such for example as fluid conducting members.

In accordance with our invention a generally circular resilient locking ring is secured to the outer part and is warped out of a single plane so that the resiliency of the ring urges one portion thereof into an angular position with respect to another portion and consequently reduces the internal dimension of the ring to thereby cause it to frictionally engage the outer surface of the inner telescoping part. The ring is so positioned that inward movement of the inner part tends to flatten the ring towards a single plane which increases the inner diameter thereof, thus reducing the friction and permitting movement in this direction. However, outward movement of the inner part increases the warping of the ring to thereby decrease its inner diameter, which causes it to tightly grip the inner part, thus preventing its withdrawal. In order that the parts may be separated when desired, manually operable means are provided for urging the different portions of the locking ring towards a single plane so as to release the ring from engagement with the inner part, thus permitting withdrawal thereof.

In accordance with one form of our invention an abutment or the like is provided to limit the distance the inner part may be inserted into the outer part, and inasmuch as the locking ring when engaged prevents withdrawal, the two parts are secured together against movement in either direction, unless the ring is released to permit separation.

In accordance with another form of our invention, two locking rings are oppositely warped so that one prevents relative movement of the parts in one direction, while the other prevents relative movement in the opposite direction. Hence, this form, as it does not depend on an abutment, may be employed to lock the two parts together in any number of different positions. Means are provided for releasing both rings simultaneously to free the parts for relative movement in either direction.

Further objects and advantages of our invention will be apparent from the following description when considered in connection with the accompanying drawings of which;

Fig. 11 is a cross-sectional view of a portion of a coupling in accordance with another embodiment of our invention;

Fig. 12 is a cross-sectional view taken on the line 12—12 of Fig. 11;

Fig. 13 is an end view of a locking ring forming part of this embodiment;

Fig. 14 is a cross-sectional view taken on the line 14—14 of Fig. 13;

Fig. 15 is a perspective view of a releasing cam forming part of this embodiment;

Fig. 16 is a cross-sectional view of the complete coupling in accordance with this embodiment with the parts in locked position;

Fig. 17 is a view similar to Fig. 16, but with the locking ring in released position;

Figure 2:
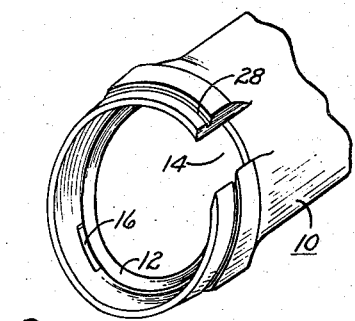
Fig. 2 is a perspective view of a portion of the device shown in Fig. 1.

Referring to the drawings, and more particularly to Figs. 1 through 7, reference character 10 designates the outer of two telescoping parts. As here shown this constitutes an elbow forming part of a suction nozzle of a vacuum cleaner, but it could be any hollow member. The inner diameter of member 10 is enlarged at the left end thereof, as viewed in Fig. 1, so as to provide a shoulder 12. The enlarged portion is formed with a comparatively large open ended slot 14 extending from the shoulder 12 to the end of the member. Diametrically opposite the slot 14 is a smaller slot 16.

Figure 1:
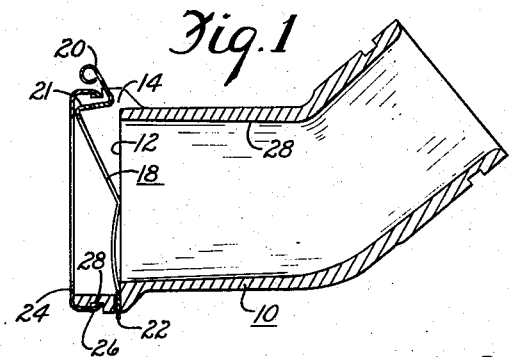
Fig. 1 is a cross-sectional view of a coupling in accordance with our invention.
Figure 3:
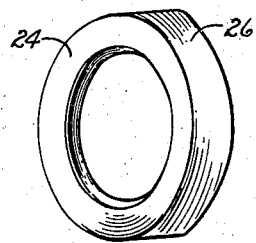
Fig. 3 is a perspective view of a retaining cap shown in Fig. 1.
Figure 4:
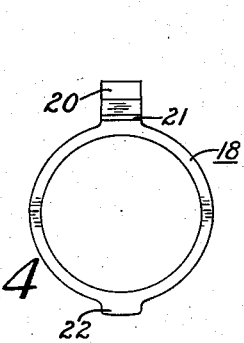
Fig. 4 is an end view of a locking ring shown in Fig. 1.

Reference character 18 designates generally a warped or dished locking ring formed with a handle portion 20 extending outwardly from an offset portion 21, diametrically opposite which is an outwardly extending tab 22. Ring 18 is made of resilient material, such as spring steel and is preformed so as to be warped out of a single plane. As is shown in Fig. 1, spring 18 is secured within the enlarged end of member 10, the tab 22 of the spring being received in the slot 16, while the handle portion 20 extends outwardly through the larger slot 14. As above stated, slot 14 is open at the end, thus permitting assembly of the ring 18 in the end of member 10. An end cap 24 is secured to the enlarged portion in any suitable manner, as by having its lip 26 rolled into an annular groove 28. Cap 24 closes the outer end of slot 16, thus retaining the locking ring in the position shown in Fig. 1. It will be noted that the lower half of the ring 18 lies closely adjacent to the shoulder 12, while the upper part extends at an angle towards the outer end of the member 10.

Figure 5:
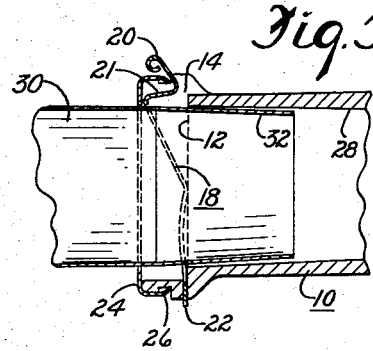
Fig. 5 is a cross-sectional view of the coupling shown in Fig. 1 about to engage the end of the inner telescoping part.
Figure 6:
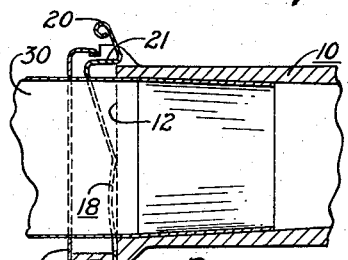
Fig. 6 is a view similar to Fig. 5, but with the coupling fully engaged.

The inner bore of member 10 is formed with a taper as is shown at 28 and the inner telescoping part 30, which may be a tube or wand which customarily is used between the nozzle and hose of a vacuum cleaner, is formed with a correspondingly tapered end 32. In Fig. 5 the inner part 30 is shown inserted part way into the outer part 10. In this position the outer surface of the inner part 30 is in contact with the upper inclined portion of the locking ring 18. Further movement of the member 30 to the right causes the upper part of the locking ring to be bent towards the plane of the lower part, thus increasing the inner diameter of the locking ring slightly so as to permit movement of the inner part 30 in this direction. This movement may be continued until the tapered end 32 seats in the tapered bore 28, as is shown in Fig. 6. With the two telescoping parts in this position it will be noted that the upper part of the locking ring 18 has been displaced towards the plane of the lower part, the resiliency of the ring tending to cause the upper part to return to the position shown in Fig. 5. This results in substantial friction between the ring and the outer surface of the telescoping part 30. If it is attempted to withdraw the inner part the friction between it and the upper portion of the ring tends to displace this upper portion further away from the plane of the lower portion, thus decreasing its internal diameter and causing it to tighten its grip on the inner telescoping part, thus preventing withdrawal.

Figure 7:
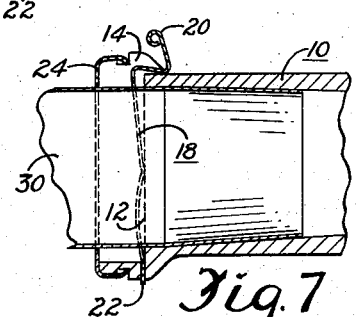
Fig. 7 is a view similar to Figs. 5 and 6, but with the coupling released from engagement with the inner part.

In order to separate the parts, the handle 20 is moved to the position shown in Fig. 7 so as to bring the upper portion of the ring into substantially the same plane as the lower portion, thus increasing its inner diameter and releasing it from engagement with the outer surface of the part 30. While the ring is held in this position the two parts may be readily separated.

Figure 8:
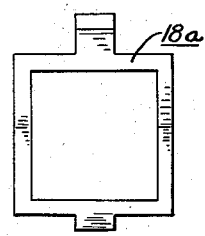
Fig. 8 is an end view of a square locking ring.

While telescoping parts are usually cylindrical, this is not necessarily so and in Fig. 8 there is illustrated a rectangular locking ring 18a which is suitable for use in connection with telescoping parts having a rectangular cross-section.

Figure 9:
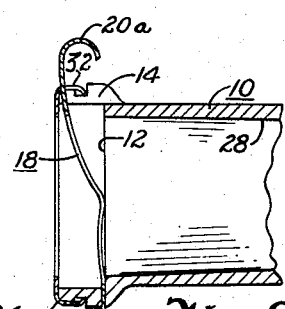
Fig. 9 is a view similar to Fig. 1, but showing a somewhat different form of our invention.
Figure 10:
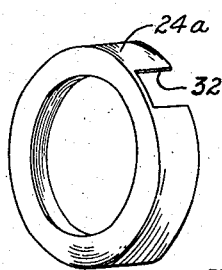
Fig. 10 is a perspective view of a cap forming part of the device shown in Fig. 9.

The embodiment illustrated in Figs. 9 and 10 is very similar to that shown in Figs. 1 through 7, except that the handle 20a of the locking ring 18 extends straight out from the upper portion of the spring and the skirt of cap 24a is formed with a slot 32 which matches with the slot 14 in the member 10. Otherwise the construction and operation of this embodiment is the same as that previously described.

In the embodiment illustrated in Figs. 11 through 17 a rotatable cam is provided for releasing the locking ring. As here shown, the outer telescoping member 40 is in the form of a tube and may be the opposite end of the tube or wand 30 shown in Figs. 5, 6 and 7. This member is formed with an enlarged end 42 provided with a pair of peripherally extending slots 44, as is shown more particularly in Figs. 11 and 12. The enlarged end is also formed with a pair of diametrically opposed openings 46.

The locking ring 48, shown particularly in Figs. 13 and 14, is formed with a pair of diametrically opposed ears 50. This ring, as was the case in the previous embodiments, is made of spring steel and is warped so that different portions of the ring are disposed in different planes. As shown in Fig. 16, this ring is assembled in the enlarged end 42 of the member 40, the ears 50 being received in the small openings 46. Due to the fact that different portions of the ring are in different planes, the internal diameter is less than would be the case if the ring were flattened out in a single plane.

In Fig. 15 there is shown a perspective view of a cam member 52 which serves to flatten the ring in order to release it from engagement from the other part, here designated by reference character 54 in Figs. 16 and 17. This inner telescoping part may be another wand similar in all respects to member 40. As shown in Figs. 15 and 16, the cam 52 is provided with diametrically opposed projections 56 extending radially therefrom which extend through the slots 44 in the enlarged end 42 of member 40. The cam is not in the form of a closed ring, but is open at 58 in order that, during assembly of the parts, the cam may be compressed sufficiently for the projections 56 to pass within the enlarged end 42 until they are aligned with the slots 44. A cap 60 is secured to the cam 52 by means of drive screws or the like 62 which engage within the small bores 64 formed in the projections 56. As will be seen from Fig. 15, the face 66 of the cam has a profile which corresponds generally to the shape of the locking ring 48 when in unstressed or warped condition. In Fig. 16 the cam is shown in the position in which it does not tend to flatten out the locking ring. In other words the locking ring grips the outer surface of the member 54 and retains it against withdrawal from the member 40. As shown, the two telescoping members are provided with mating shoulders 68 which limit the distance the inner member may be inserted in the outer member.

When it is desired to release the locking ring from engagement with the inner member, the cap 60 is turned, thus rotating the cam 52 through an arc determined by the extent of the slots 44. This causes the high points 70 of the cam to contact the spring and flatten it towards a single plane, as is shown in Fig. 17. This results in increasing the internal diameter of the ring, thus releasing it from engagement with the telescoping member 54 and consequently the latter may be withdrawn.

In the embodiment illustrated in Figs. 18 through 21 a pair of oppositely warped locking rings is provided for engagement with the inner telescoping member. Inasmuch as one of the locking rings prevents movement of the inner member in one direction, while the other prevents movement in the opposite direction, the two parts may be locked together in any position against movement in both directions, inasmuch as a stop in the form of either mating tapers or shoulders is not required.

Figure 18:
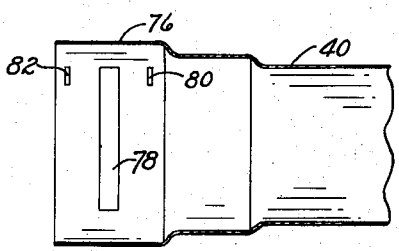
Fig. 18 is a cross-sectional view of a portion of a coupling in accordance with a further embodiment of our invention.

In Fig. 18 the outer member 40, which again may be a tube or wand for a vacuum cleaner, is provided with an enlarged end 76 formed with a pair of peripherally extending slots 78 and with two pairs of diametrically opposed openings 80 and 82, the openings 80 being disposed axially to one side of the slot 78, while the openings 82 are disposed axially to the other side of the slots.

Figure 19:
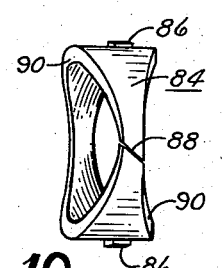
Fig. 19 is a perspective view of a cam forming part of this further embodiment.
Figure 20:
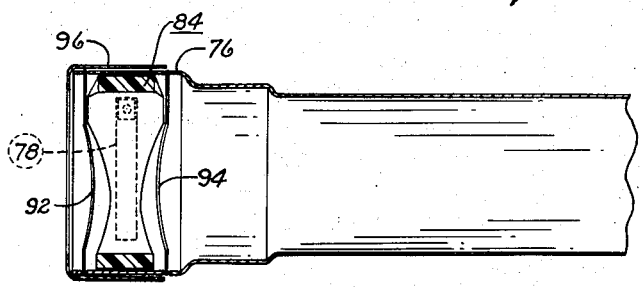
Fig. 20 is a cross-sectional view of the outer part of the coupling in accordance with this embodiment.

In Fig. 19 there is shown a double faced cam 84 provided with diametrically opposed radial projections 86. This cam is slit, as is indicated at 88, in order that it may be compressed sufficiently so that the projections 86 may pass within the enlarged end 76 until they are in alignment with the slot 78, whereupon the projections will extend into these slots. Each face 90 of cam 84 is similar to the face 66 of the cam 52 shown in Fig. 15.

Figure 21:
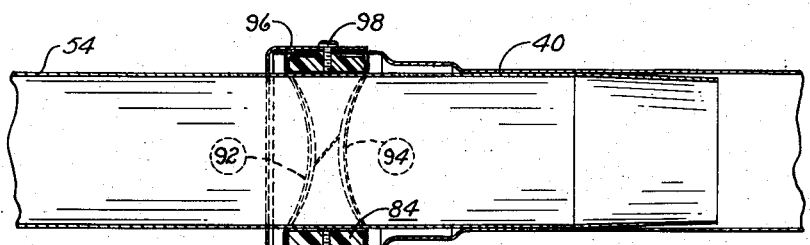
Fig. 21 is a cross-sectional view of this coupling with the two parts engaged.

A pair of locking rings 92 and 94 is disposed within the enlarged end 76. Each of these rings is similar to the ring 48 shown in Figs. 13 and 14 and each ring is provided with a pair of ears received within the openings 80 and 82, respectively. In assembling the parts, a ring 94 is first placed in position with its ears entering the openings 80 and with the ring warped therefrom towards the outer end of the wand 40. The cam 84 is next placed in position and thereafter the other ring 92 is inserted, but reversed with respect to the first ring so that it is warped away from the outer end of the tube 40. A cap 96 is secured to the cam 84 by means of a pair of drive screws 98 or the like which engage holes in the projections 86. Consequently, rotation of the cap 96 with respect to the tube 40 causes the cam 84 to be rotated, the extent of the rotation being limited by the arcuate extent of the slots 78. With the parts in the position shown in Fig. 20, the cam has been rotated to the position in which the high points of the cam faces bear against the locking rings 92 and 94 so as to tend to force the different portions of each ring into a single plane, thus increasing the internal diameter of each ring. In this position the inner member 54 may be inserted to any extent desired, limited only by the length of the inner member, and this member may be moved freely in either direction. In Fig. 21, the cam 84 has been rotated so as to permit the locking rings 92 and 94 to assume their normal warped condition, thus reducing the inner diameter of each ring. If the inner member 54 is attempted to be moved towards the right, as viewed in Fig. 21, the friction between it and the outer locking ring 92 will tend to warp the latter still further, thus further decreasing its inner diameter and consequently increasing its grip on the inner member, with the result that the inner member cannot be moved in this direction. On the other hand, if force is applied to the inner member to withdraw it, the friction between it and the inner locking ring 94 tends to increase the warping of the latter, thus increasing its grip on the inner member. Consequently, the inner member is locked against movement in either direction and, inasmuch as no shoulders or tapers are required, the members may be locked in any desired position.

Figure 22:
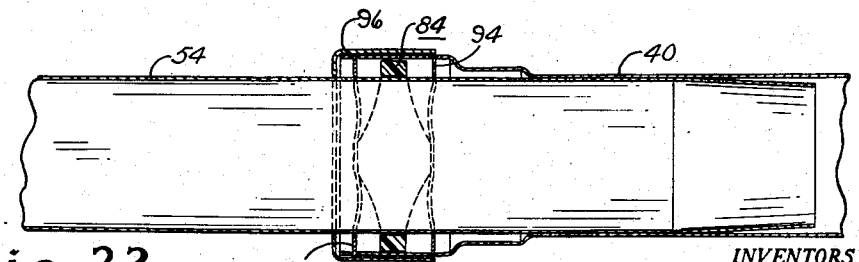
Fig. 22 is a cross-sectional view similar to that shown in Fig. 21, but with the locking rings disengaged.

In order to release the members the cap 96 is rotated so as to bring the cam into the position shown in Fig. 22, where each of the locking rings has been flattened towards a single plane and thus has been released from engagement with the inner member 54. Consequently, this member is free to be moved in either direction.

While we have shown and described several embodiments of our invention, it is to be understood that this has been done for the purpose of illustration only and that the scope of our invention is not to be limited thereby, but is to be determined from the appended claim.

What we claim is:

In a coupling for releasably fastening together inner and outer tubular telescopic parts the outer of which has an internal groove adjacent one end adapted to encircle the inner part received therein, a thin resilient locking ring having a tab extending from its outer edge and another tab extending from a remote edge, said ring being bent at an obtuse angle along its mid-portion transversely between said tabs, one of said tabs being retained within the wall of the outer part for maintaining the portion of the ring between said tab and said bent portion next to the inner side of the groove and with the other portion of the ring in said groove biased from the portion of the ring next to the inner side of the groove at an obtuse angle, the inner part being adapted to extend through the inner diameter of the ring with at least the one portion of the ring adjacent the other of the tabs flexibly movable into clamping engagement therewith, the tab on the opposite side of the ring extending exteriorly of the outer part and having means by which said ring may be manually flexed and temporarily straightened thereby increasing the obtuse angle of the ring and the inner effective diameter thereof and relieving the clamping action of said ring on said inner part to allow the removal of the latter.

References Cited in the file of this patent

UNITED STATES PATENTS

| | | |
|---|---|---|
| 754,502 | Rockwell | Mar. 15, 1904 |
| 836,303 | Christensen | Nov. 20, 1906 |
| 1,369,687 | Martin | Feb. 22, 1921 |
| 2,125,477 | Whitney | Aug. 2, 1938 |
| 2,286,991 | MacFadden | June 16, 1942 |
| 2,389,157 | Kottemann | Nov. 20, 1945 |
| 2,457,908 | Meyerhoefer | Jan. 4, 1949 |
| 2,483,395 | Benson | Oct. 4, 1949 |
| 2,681,807 | Krafft | June 22, 1954 |
| 2,691,537 | Bashark | Oct. 12, 1954 |

FOREIGN PATENTS

| | | |
|---|---|---|
| 284,985 | Switzerland | Dec. 16, 1952 |
| 1,112,609 | France | Nov. 16, 1955 |